Nov. 30, 1937.  B. C. BEHNKE  2,100,896
COTTER PIN
Filed June 1, 1937
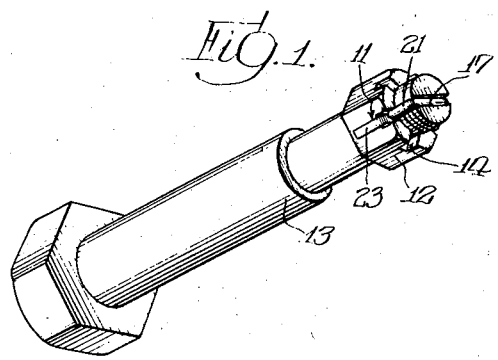
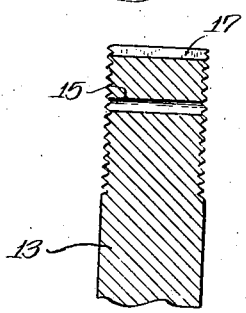
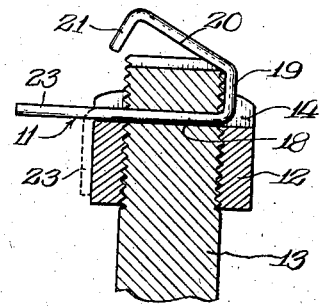
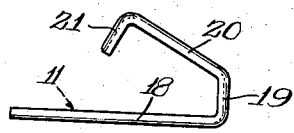
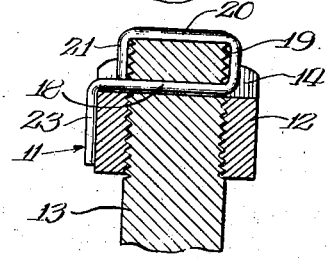
Inventor:—
Bertram C. Behnke,
By Louis Robertson Atty.

Patented Nov. 30, 1937

2,100,896

UNITED STATES PATENT OFFICE 2,100,896

COTTER PIN

Bertram C. Behnke, Chicago, Ill.

Application June 1, 1937, Serial No. 145,776

9 Claims. (Cl. 151—5)

This invention relates to cotter pins and to the combination of such cotter pins and a particular form of bolt.

The well known form of cotter pin comprises a stiff wire doubled near its middle to form a head and two legs, with one leg usually slightly longer than the other. In utilizing this cotter pin according to the present prevailing practice it is necessary, after the pin has been inserted through the hole, to pry the two projecting ends apart and bend one in one direction and the other in the opposite direction. Although the amount of time thus required to separate and bend back the ends is not very great in individual instances, nevertheless a great deal of time is consumed in the operation during the course of a day's work on an assembly line, since thousands of cotter pins must be inserted every day.

According to the present invention, a great deal of time is saved during a day by the use of a cotter pin which is of such form that its ends do not need to be separated, and furthermore may both be tapped down in an extremely easy manner from the direction of the exposed end of the bolt. The form of cotter pin which makes this saving possible has one straight leg adapted to pass through the cotter pin hole in the bolt and another leg which passes over the end of the bolt as the pin is inserted and is then tapped down into place with the end of this leg extending down the far side of the bolt and preferably extending into one of the notches in the nut. It is preferred that the end of the bolt be slotted with a slot parallel to the cotter pin hole so that the leg of the cotter pin extending over the bolt will fall into this slot and furnish a reserve key to prevent the leg through the hole from being sheared off.

From the foregoing, it is evident that an object of the invention is to provide a cotter pin which may be inserted into the bolt more easily and quickly, and which will nevertheless be satisfactory and sufficiently safe.

Additional objects will be apparent from the following description and from the drawing, in which:

Fig. 1 is a perspective view of a nut and bolt, with the preferred form of cotter pin applied thereto.

Fig. 2 is a fragmentary sectional view of the preferred form of bolt for use with this cotter pin.

Fig. 3 is a side view of the preferred form of cotter pin before insertion.

Fig. 4 is a fragmentary sectional view of a nut and bolt with the cotter pin of Fig. 3 inserted therein before its legs have been bent down.

Fig. 5 is a similar view showing the ends bent down.

Although this invention may take various forms, only one has been chosen for the purpose of illustration. In this form of the invention the cotter pin 11 is applied to a nut 12 and bolt 13, the nut 12 being provided with the usual notches 14 and the bolt being provided with the usual cotter pin hole 15, through which the cotter pin is inserted. It is preferred also that the bolt 13 be provided with a slot 17 at its outer end, the slot being parallel with the hole 15. Such a slot is not only useful in combination with the cotter pin as described below, but saves considerable time in alining one of the notches 14 with the hole 15 by showing the position of the hole 15 even when it is covered up.

The preferred form of cotter pin includes a straight leg 18 and a bent leg which includes a portion 19 extending at right angles to the leg 18, a portion 20 extending in the general direction but away from the leg 18, and a portion 21 at right angles to the portion 20. The portion 19 could be considered the head, and the portions 20 and 21 the second leg.

In applying the cotter pin, the nut is first tightened up on the bolt to approximately the desired tightness and it is then taken up enough more to aline it with the hole, the hole being easily located by virtue of its being parallel with the slot 17. Next, the straight leg 18 of the cotter pin is inserted through one of the notches 14 and into the hole 15, and the cotter pin is then pushed all the way in (Fig. 4), the portions 20 and 21 passing over the end of the bolt 13 by passing through the slot 17. It is then merely necessary to bend the extended end 23 of the leg 18 down alongside of the nut 12, as seen in Fig. 5, and to bend the end 20 down into the slot 17, as also seen in Fig. 5. This bending is accomplished most easily, and in fact in almost no time at all, by tapping the respective portions of the pin with any suitable tool.

It will be seen that the leg 18 keys the nut at both ends as has been the case in the past. In addition, the upper leg 19, 20 and 21 keys the nut at both ends by virtue of the fact that its portion 20 is locked in the slot 17. It should be mentioned that the portion 21 is preferably long enough to extend into one of the notches 14. These notches should be deep enough to receive both the leg 18 and the end of the portion 21. Since only a single leg is passed through the hole 15, the cotter pin may be made of heavier material than heretofore, in which case it may be even safer in its total effect than cotter pins of the past. The material of which the cotter pin is formed may be flattened on one or both sides, or neither, as preferred. It bends more easily when flattened. Furthermore, if the flat side of the cotter pin is positioned downwardly in the slot 17, the slot 17 may be quite shallow without danger that any twisting forces will spring it out of the slot. With a cotter pin which is round in cross section, the slot 17 should be at last deep enough so that the widest portion of the cotter pin will extend into the slot. In other words, the slot 17 should be at least half as deep as the thickness of the round cotter pin.

The leg 19, 20 and 21 extending over the end of the bolt is believed to have an unusual action in positively preventing complete shearing of the main leg 18. It appears that as soon as any shearing begins, this outer leg is resiliently distorted with the result that it constantly tends to turn the nut back toward a centered position. This is very effective in preventing further shearing, because the shearing forces are usually abnormal and occur only rarely, and in the interim between the exertion of such forces, the resiliency of the outer leg will sometimes turn the nut back toward the centered position, thus providing a little clearance so that when the shearing force next appears it must turn the nut a little ways against the resiliency of the outer leg before it can reach a position to shear the leg 18 further.

The disclosures of this application are illustrative and the invention is not to be limited by them. In fact, if modifications or improvements are not at once obvious, they may be devised in the course of time to make additional use of the broad ideas taught and covered by this application. The claims are intended to point out novel features and not to limit the invention except as may be required by prior art.

I claim:

1. A cotter pin including a leg adapted to pass through the bolt and be bent over, and another leg adapted to pass over the end of the bolt and be bent down.

2. A combination of a bolt having a hole therethrough, a nut having recesses therein adapted to be alined with the passage, and a cotter pin having one leg passing through said recesses and passage, and bent along the nut, and another leg passing over the bolt and bent along the far side of the bolt.

3. A cotter pin bent at a midpoint and provided with one straight leg adapted to pass through a bolt, and another leg extending initially at an angle of at least approximately 90° from the first leg, and adapted to be bent down over the end of the bolt.

4. A cotter pin bent at a midpoint and provided with one straight leg adapted to pass through a bolt, and another leg extending initially at approximately 90° from the first leg and having two bends therein, one at approximately 90° near the end of the leg, and the other of over 90°, the straight leg extending a substantial distance beyond the bent leg.

5. A cotter pin having a mid-portion adapted to lie outside of a bolt, a straight leg extending therefrom, a second leg extending initially therefrom in a direction receding from the first leg, and having its end portion turned at approximately 90° to extend toward the straight leg, the straight leg extending a substantial distance beyond the bent leg.

6. The combination of a threaded stud having a hole therein and a slot at its end parallel to the hole, a nut screwed on said threaded stud, and a cotter pin having one leg extending through the hole and into the far side of the nut, and the other end extending over the bolt through the slot.

7. The combination of a threaded stud having a hole therein and a slot at its end parallel to the hole, a nut screwed on said threaded stud, and a cotter pin having one leg extending through the hole and into the far side of the nut, and the other end extending over the bolt through the slot and down into the nut on the far side of the threaded stud.

8. The combination of a threaded stud having a hole therethrough, and a slot at its end parallel to said hole, a nut screwed on the stud and having notches adapted to be alined with the hole, and a cotter pin having two legs, one extending from the junction of the legs through the hole, through a notch on the far side of the hole, and bent to extend along the nut parallel to the axis of the stud, and the other of the legs extending over the stud through the slot and along the stud in a direction parallel to the axis of the stud.

9. A combination of a stud having a passage therethrough, a nut having recesses therein adapted to be alined with the passage, and a cotter pin having one leg passing through said recesses and passage, and bent on both sides of the stud, and another leg passing over the stud and bent along the far side of the stud.

BERTRAM C. BEHNKE.